(12) United States Patent
Reithmeier et al.

(10) Patent No.: US 6,273,509 B1
(45) Date of Patent: Aug. 14, 2001

(54) CHILD'S SEAT FOR MOTOR VEHICLES

(75) Inventors: Harald Reithmeier, Stadtsteinach; Walter König, Münsingen, both of (DE)

(73) Assignee: Concord Kinderautositze und Kindermöbel sowie Geräteherstellungsgesellschaft mbH, Stadtsteinach (DE)

( * ) Notice: Subject to any disclaimer, the term of this patent is extended or adjusted under 35 U.S.C. 154(b) by 0 days.

(21) Appl. No.: 09/486,249

(22) PCT Filed: Jul. 1, 1998

(86) PCT No.: PCT/DE98/01875

§ 371 Date: Feb. 18, 2000

§ 102(e) Date: Feb. 18, 2000

(87) PCT Pub. No.: WO99/10197

PCT Pub. Date: Mar. 4, 1999

(30) Foreign Application Priority Data

Aug. 21, 1997 (DE) .......................................... 297 14 903 U

(51) Int. Cl.⁷ .................................................... A47C 1/10
(52) U.S. Cl. ........................................... 297/410; 297/391

(58) Field of Search ...................................... 297/410, 396, 297/391, 404

(56) References Cited

U.S. PATENT DOCUMENTS

| 3,366,417 | * | 1/1968 | Belk ................................ 297/410 X |
| 5,308,028 | * | 5/1994 | Kornberg ........................ 297/410 X |

FOREIGN PATENT DOCUMENTS

| 3023140 | * | 1/1982 | (DE) ..................................... 297/410 |
| 4204232 |   | 9/1992 | (DE) . |
| 232237  | * | 8/1987 | (EP) ..................................... 297/410 |
| 0326265 |   | 8/1989 | (EP) . |
| 14025   | * | 7/1905 | (GB) ..................................... 297/410 |

* cited by examiner

*Primary Examiner*—Laurie K. Cranmer
(74) *Attorney, Agent, or Firm*—Schweitzer Cornman Gross & Bondell LLP

(57) ABSTRACT

The invention relates to a child seat (10) for motor vehicles, comprising a seat (12), a backrest (14) and a head rest (22). The head rest (22) has two side cheeks (28) and a central part (30) connecting both side cheeks. The head rest (22) is fitted on the backrest (14) and is height-adjustable. The central part of the head rest (22) covers only the back part (4) of the backrest (14). The backrest (14) has a guiding device along which the height of the head rest (22) can be adjusted.

16 Claims, 7 Drawing Sheets

CHILD'S SEAT FOR MOTOR VEHICLES

Figure 1:
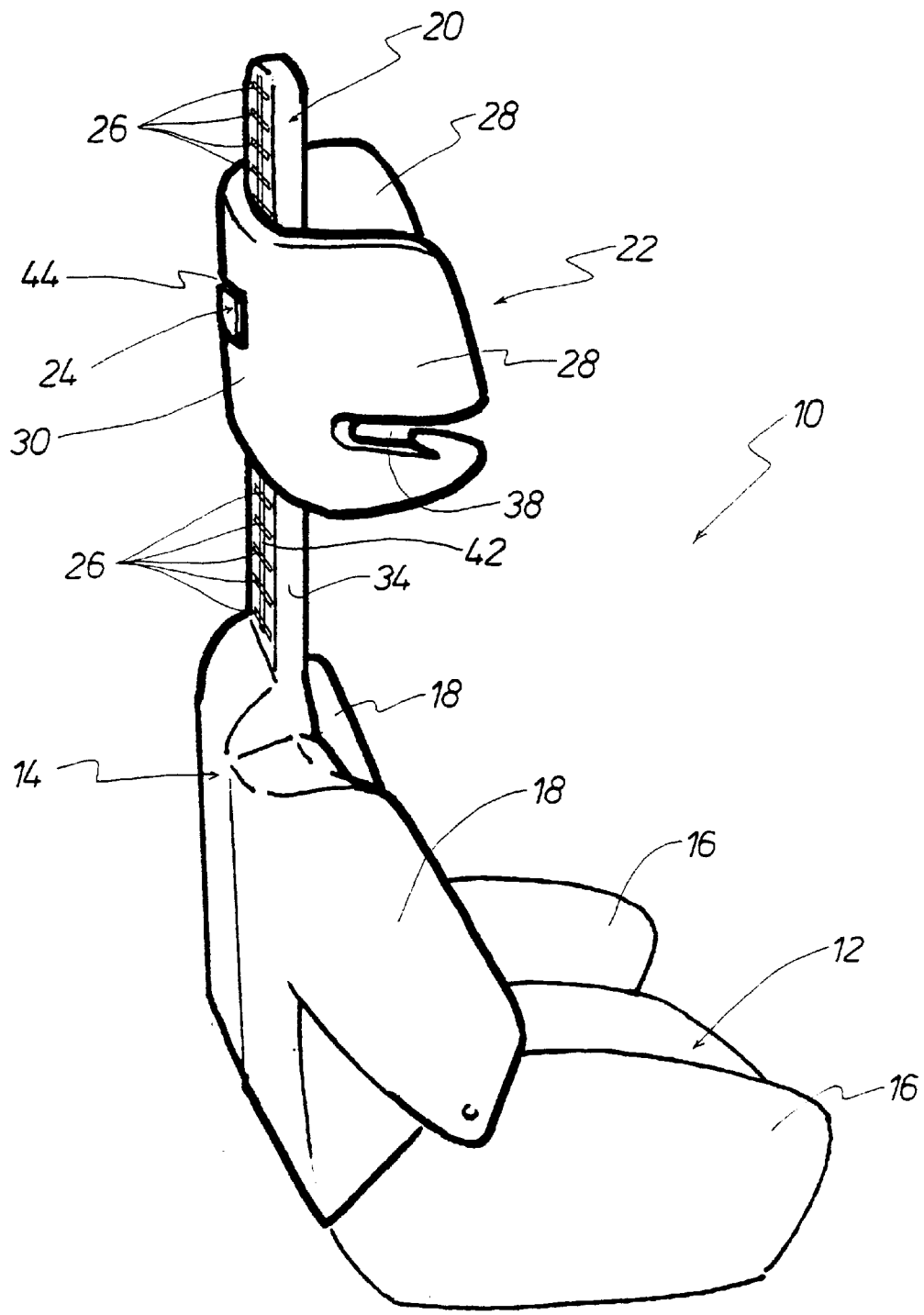

The invention concerns a child's seat for motor vehicles, having a seat portion, a backrest and a head support which has two side support portions and a central portion connecting the two side support portions and which is disposed adjustably in respect of height on the backrest, wherein on the outside the backrest has a guide device, along which the head support is guided adjustably in respect of height.

A child's seat is known from DE 295 10 642 U1, in which the backrest is provided with an opening intended for the insertion of a bar-like connecting member. The connecting member extends downwardly away from the central portion of the head support. The opening in the backrest means that it is mechanically weakened, which represents a disadvantage in this respect. In such a child's seat the seat portion, the backrest and the head support are usually covered with a decorative cover. The connecting member which extends downwardly away from the central portion of the head support is usually not covered by the above-mentioned cover so that, when the head support is raised up out of the backrest, the connecting member becomes visible, in such a way as to spoil the seat. In addition the strength of the mechanical connection between the backrest and the head support is reduced when the head support is moved out of the backrest because the depth of insertion of the bar-like connecting member which projects downwardly from the head support, in relation to the backrest, is correspondingly reduced when the head support is displaced out of the backrest.

A similar child's seat to that described above is also known for example from EP 0 326 265 A2. In that known child's seat the head support is connected adjustably in respect of height to the backrest for example by means of two connecting elements which are curved in the shape of a walking stick, similarly to the head support of a vehicle seat.

DE 42 04 232 C2 discloses a child's seat for motor vehicles, having a backrest with a head support which is adjustable in respect of height (see FIG. 17). This known child's seat also suffers from the disadvantage that, when a head support is set correspondingly high, a region which is without any cover remains between the head support and the backrest, and that is considered to spoil the effect. In addition, in this case also the mechanical strength of the connection between the head support and the backrest is reduced when the head support is correspondingly adjusted high, and that represents a further disadvantage.

A child's seat of the kind set forth in the opening part of this specification is known from GB 2 296 655 A. The backrest of that known child's seat is divided into two portions, namely an upper portion and a lower portion. At each of its two mutually remote side edges the lower portion is provided with a respective guide channel. The upper backrest portion is formed at the top side with the head support from which two side support portions project forwardly. Mutually spaced lateral backrest side supports project downwardly from the upper backrest portion. The backrest side supports project into the guide channels so that the upper backrest portion with the head support integrally connected thereto is adjustable in respect of height in relation to the lower backrest portion. In that known child's seat the backrest side supports are connected together only at the top side—and not along the guide portion—, which has a corresponding effect on the guidance properties and the strength and stability involved.

The object of the present invention is to provide a child's seat of the kind set forth in the opening part of this specification, in which the cover covers the child's seat, irrespective of the respective heightwise setting of the head support, in which the mechanical strength is independent of the respective heightwise setting of the head support and in which the head support is adjustable as desired in respect of height, using simple means.

In the case of a child's seat of the kind set forth in the opening part of this specification, that object is attained in accordance with the invention in that the head support extends with its central portion over the rear of the backrest, and that the head support has two mutually spaced clamping members which, adapted to the guide device for the backrest, are disposed in the transitional region between the central portion and the respective side support portion at the front side of the head support.

In the child's seat according to the invention therefore the head support does not project beyond the backrest in the direction of its height so that the mechanical strength is determined by the backrest itself. As the head support extends over the backrest with its central portion at the rear, it is advantageously possible for the child's seat to be provided with a decorative cover which covers the backrest on the front side. The head support can also be provided with a cover which extends over the two side support portions of the head support and the backrest at the front side thereof. Irrespective of the respective setting in respect of height of the head support relative to the backrest, the child's seat according to the invention therefore avoids a cover-free region, as is inevitable in the case of the known child's seats of the above-indicated kind.

The guide device of the backrest can be simply formed by the two mutually remote side edges of the backrest, but it is also possible for the backrest at its front side to be provided along its two side edges with a respective guide groove or channel which, forming the guide device, extend in mutually parallel relationship and into which the clamping members of the head support engage in positively locking relationship. In this case the clamping members are adapted in shape to the guide device of the backrest in such a way that the head support is adjustable in respect of height on the backrest with the application of a small amount of force and in a play-free manner. The guide channels can be provided on the backrest directly and immediately, but it will be appreciated that it is also possible for the guide channels to be produced independently of the backrest and secured thereto.

The head support can be fixed to the backrest by means of an arresting device which is provided on the head support and which has a resilient retaining member. In that case, the arresting device can be provided for stepless or for stepwise adjustment in respect of height of the head support relative to the backrest. In the latter case involving stepwise adjustability in respect of height of the head support relative to the backrest, the backrest can be provided at its rear side with retaining openings which are spaced from each other in the heightwise direction and which are adapted in respect of shape to the resilient retaining member. The retaining openings and the resilient retaining member in that case may be of a ratchet-like configuration or may co-operate in ratchet-like manner, in such a way that it is indeed possible for the head support to be raised without actuating the arresting device, but it is not possible, without actuating the arresting device, for the head support to be displaced downwardly on the backrest.

It has proven to be desirable if the arresting device has a two-armed lever assembly which is pivotable about a central pivot axis between an arresting position and a release position, wherein provided at the end portion of the one lever arm of the lever assembly is the retaining member and provided at the end portion of the second lever arm is an actuating handle which is accessible and actuatable through a hole in the central portion of the head support from the rear, the pivot axis is formed by a transverse rib which is integrally connected to the lever assembly and which is supported in a transverse groove or channel provided at the front side of the central portion of the head support and spaced from the hole for the actuating handle, and a spring element is provided between the lever assembly and the central portion of the head support.

In this case, the transverse rib forming the pivot axis of the arresting device can be of a transverse dimension which is adapted to the transverse dimension of the actuating handle, and it can be connected to the actuating handle by lateral connecting limbs so that the actuating handle, the transverse rib and the two lateral connecting limbs define a frame which embraces a projection in the central portion of the head support, the projection being defined by the transverse channel and two lateral limb grooves which open into the hole in the central portion of the head support. Such a configuration with the above-mentioned projection in the central portion of the head support and the configuration of the arresting device with a frame embracing said projection make it easily possible for the arresting device to be accurately positioned on the central portion of the head support. That is desirable from points of view of assembly and fitting. In addition it is desirable if the central portion of the head support is formed with a transverse opening spaced from the transverse channel for the transverse rib, and a longitudinal opening connecting the transverse channel to the transverse opening, wherein in the release position of the actuating handle the longitudinal opening is provided to receive a corresponding portion of the first lever arm of the lever assembly and the transverse opening is provided to receive the retaining member formed by a transverse bar. That makes it possible to provide for a compact configuration for the central portion of the head support, wherein the retaining member can be disposed without any difficulty and in accurately positioned relationship between the head support and the backrest.

The first lever arm of the two-armed lever assembly of the arresting device of the child's seat according to the invention is preferably formed between the pivot axis transverse rib and the transverse bar forming the retaining member with a blind hole which is provided for fixing the one end portion of the spring element. That spring element is desirably a compression coil spring. The compression coil spring is fixed with its one end portion in the last-mentioned blind hole. Thereafter the arresting device can then be positioned in accurately fitting relationship on the central portion. The head support can then be mounted to the backrest.

In accordance with the invention the longitudinal opening in the central portion of the head support can be formed with a second blind hole which is provided for fixing the second end portion of the spring element. That therefore provides for accurately defined fixing of the spring element overall between the arresting device and the central portion of the head support of the child's seat according to the invention.

In order in the assembled condition of the child's seat, that is to say when the head support is mounted to the backrest, to be able to move the arresting device from its normal rest or arresting position into the release position, which is effected by a pivotal movement of the arresting device about its pivot axis, it is preferred if the two-armed lever assembly is formed with a sliding back at the side which is opposite to the transverse rib forming the pivot axis. That sliding back forms a support means about which the actuating handle is pivotable from the arresting position into the release position. In this case, at the same time the spring element is mechanically stressed between the central portion of the head support and the arresting device. When the actuating handle is released again, the spring element can be relieved of stress, in which case the arresting device is automatically displaced from the release position into the arresting position again.

In order to prevent the head support from tilting laterally in relation to the backrest, the central portion of the head support can be provided at its front side with at least one guide rib projecting into a longitudinal channel which is provided at the rear side of the backrest and towards which the retaining member of the arresting device is urged by means of the spring element in the normal arresting position. It is preferable if the central portion of the head support, at its front side, has two mutually spaced guide ribs, with the arresting device being provided between the two guide ribs.

Stepwise displacement of the head support in relation to the backrest is possible if the longitudinal channel is formed with mutually spaced transverse channels into which the retaining member of the arresting device can be urged by means of the spring element in the normal arresting position. As already mentioned hereinbefore, the above-mentioned transverse channels and the resiliently disposed retaining member of the arresting device can be of a ratchet-like configuration in such a way that it is in fact possible for the head support to be raised without actuating the arresting device, but that, without actuating the arresting device from the arresting position into the release position, it is not possible for the head support to be displaced downwardly on the backrest.

In order to prevent the head support from unintentionally coming away from the backrest upon adjustment in respect of height, the longitudinal channel provided at the rear side of the backrest can be closed at its upper end by means of a closure element. That closure element can be for example a closure plug which can be screwed fast to the upper end of the longitudinal channel.

It can be desirable in the case of the child's seat according to the invention if the side support portions are formed with hook-shaped openings for a diagonal vehicle belt.

Figure 2:
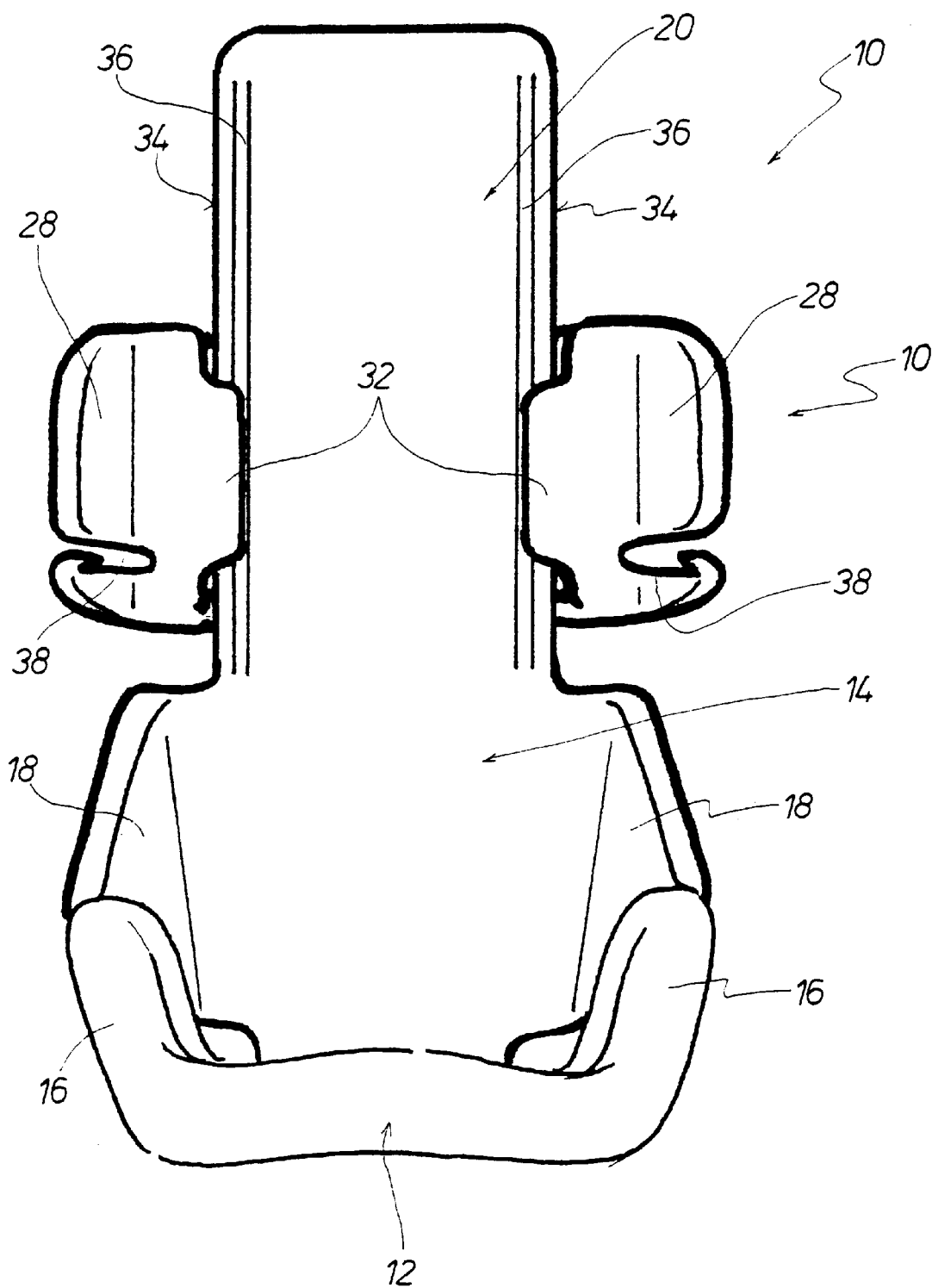
Figure 3:
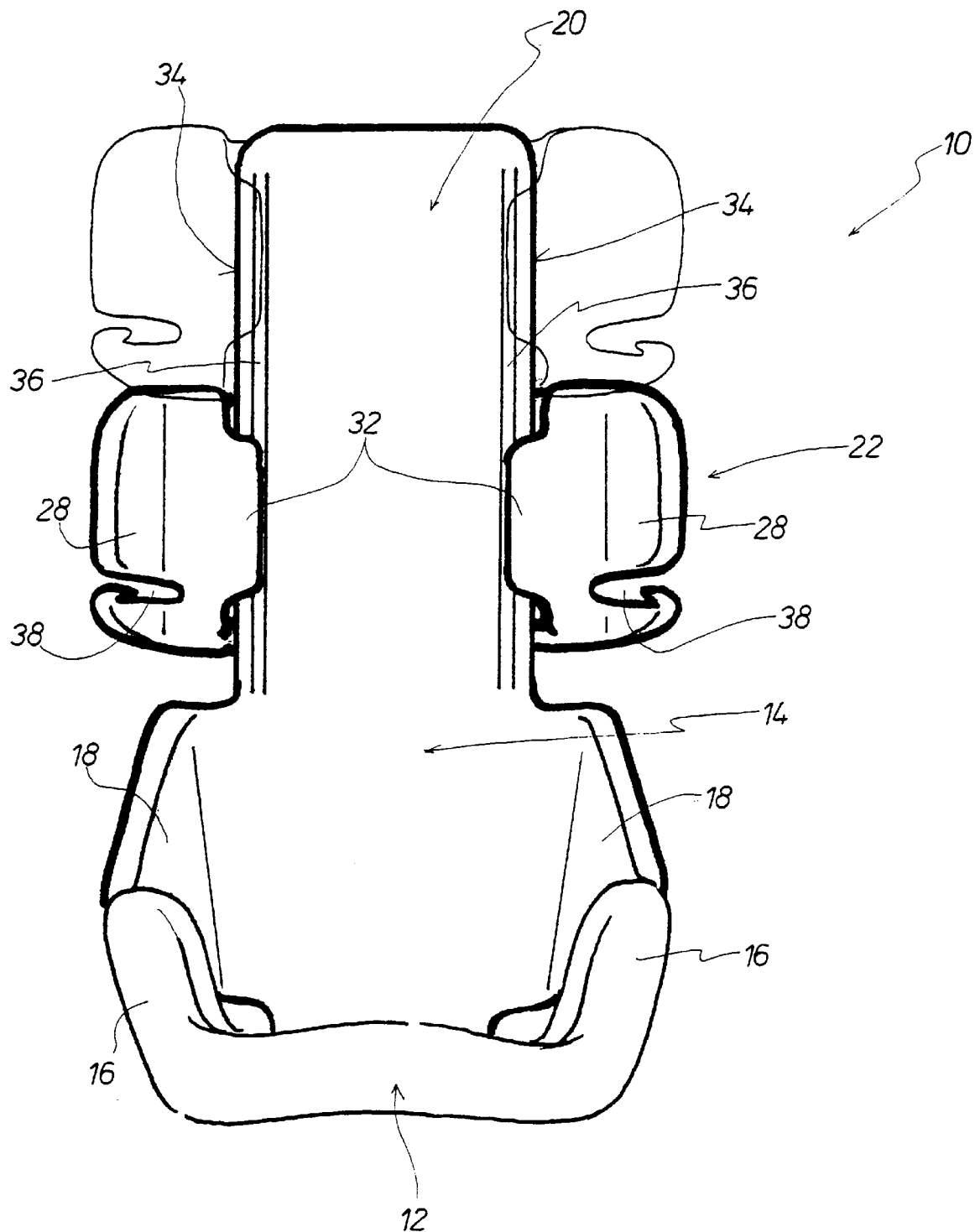
Figure 4:
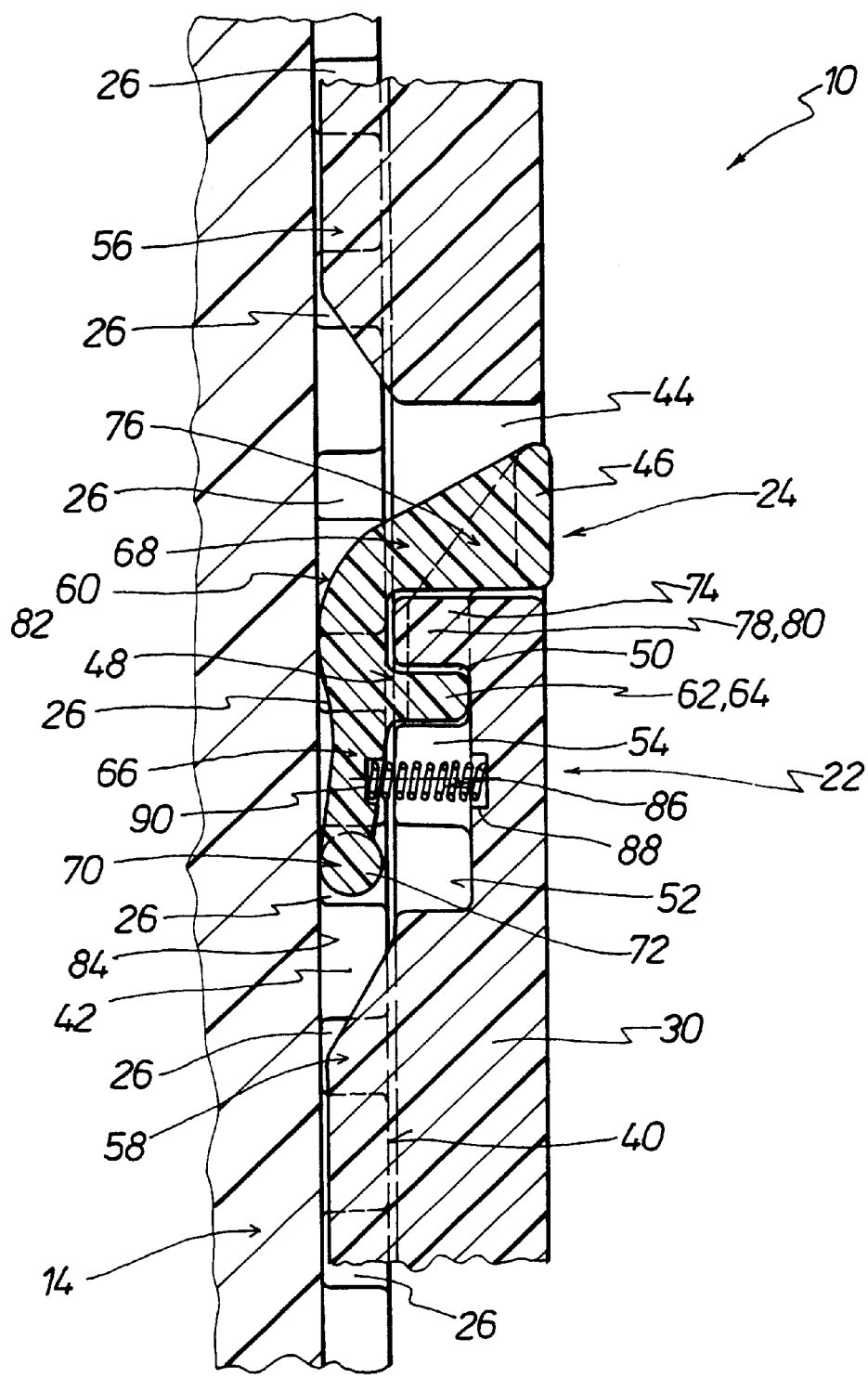
Figure 5:
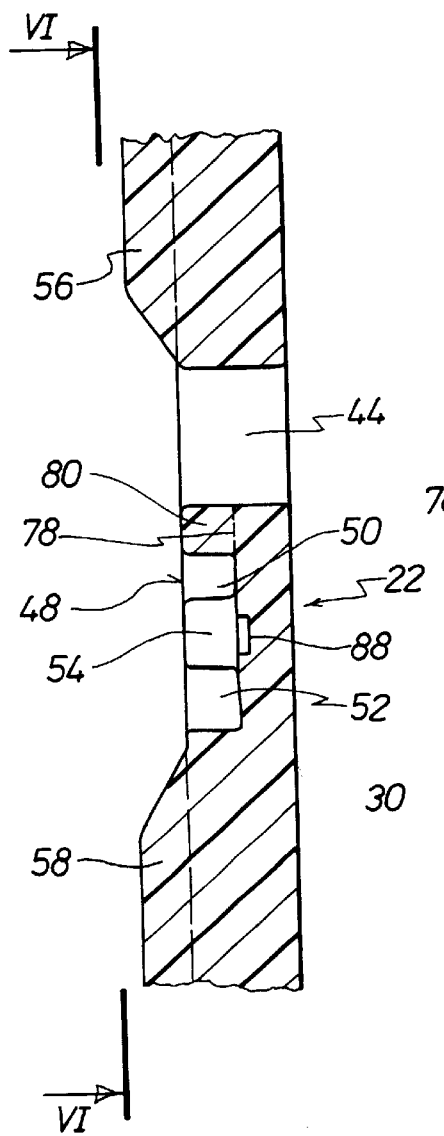
Figure 6:
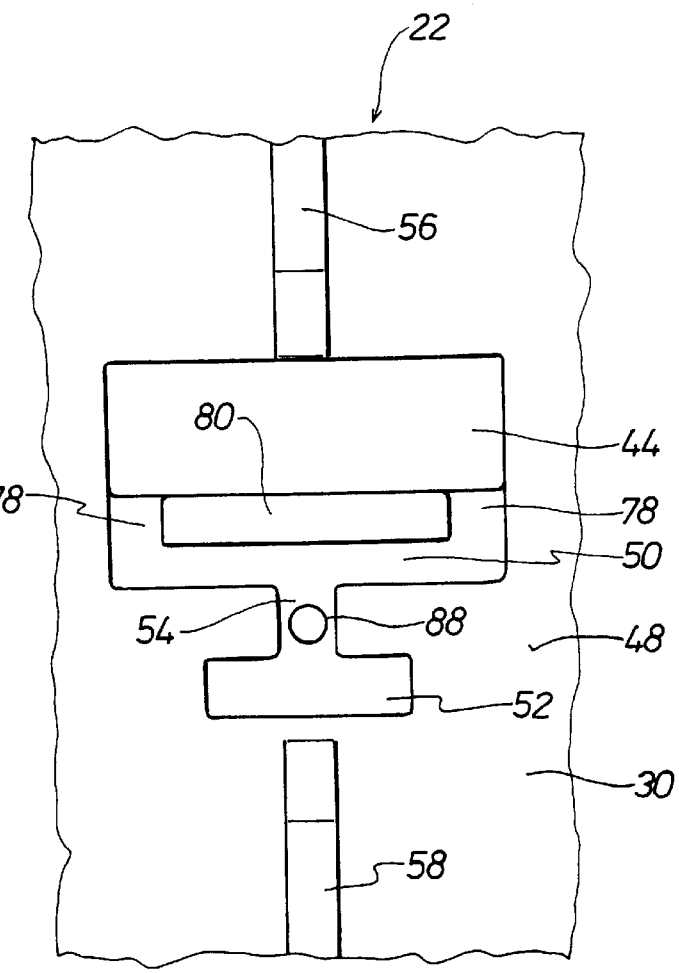
Figure 7:
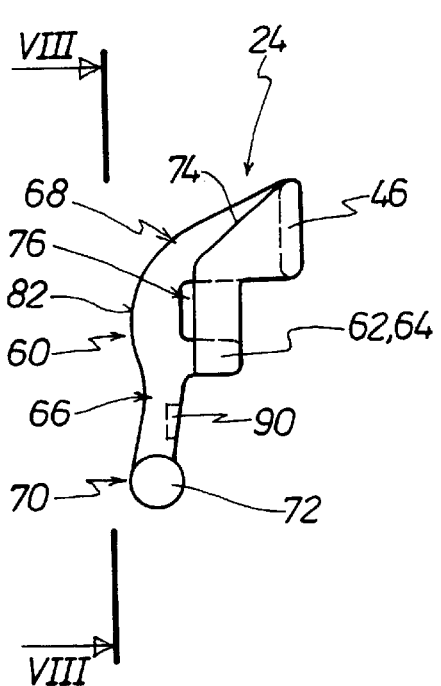
Figure 8:
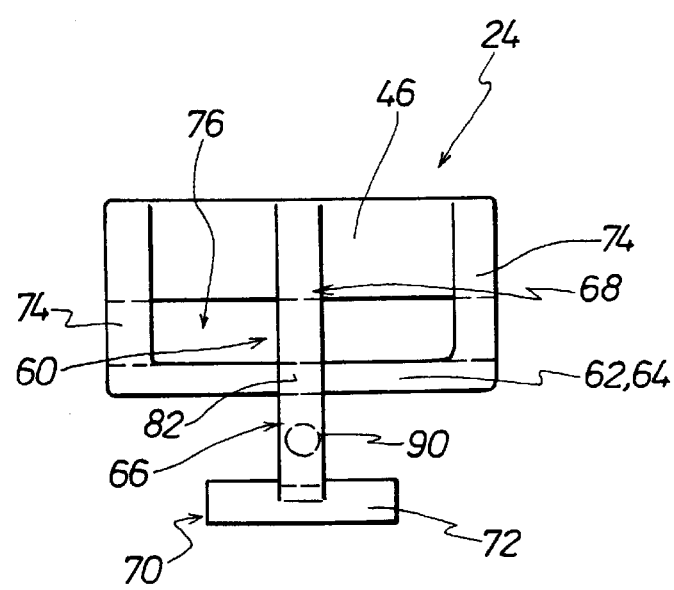
Figure 9:
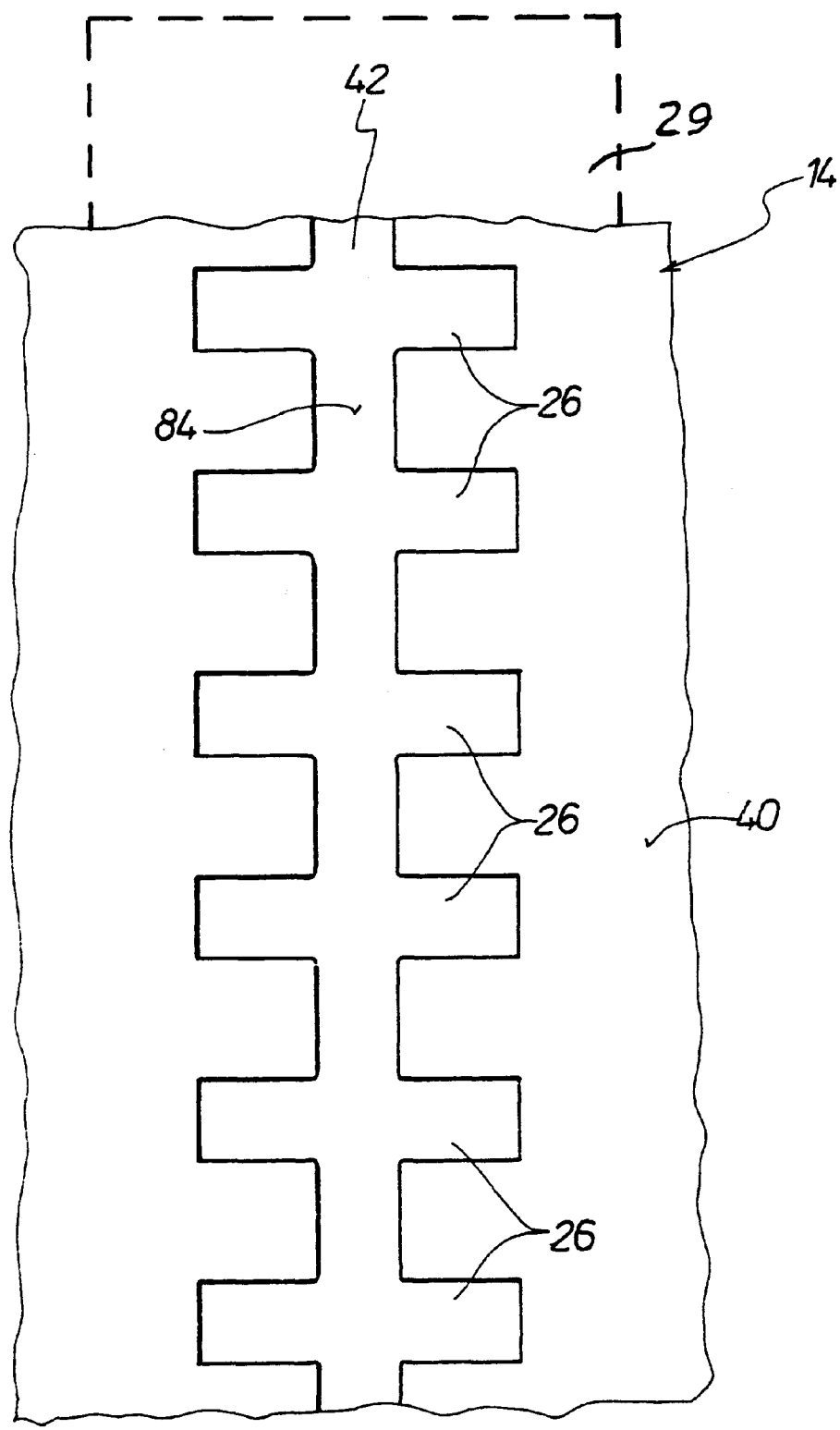

Further details will be apparent from the following description of an embodiment of the child's seat according to the invention for vehicles, as shown in the drawing in which:

FIG. 1 is a perspective side view of the child's seat viewing inclinedly from above, FIG. 2 is a front view of the child's seat as shown in FIG. 1, FIG. 3 is a front view similar to FIG. 2 of the child's seat, wherein the head support is shown in solid thick lines in the lowered position as also shown in FIG. 2, and is shown in thinner lines in a raised position, FIG. 4 is a view in longitudinal section illustrating a part of the backrest and a part of the central portion of the head support together with the arresting device disposed therebetween, FIG. 5 is a view similar to FIG. 4 showing the part of the central portion of the head support alone, FIG. 6 is a view of the part of the central portion of the head support viewing in the direction of the arrows VI—VI in FIG. 5, FIG. 7 is a sectional view similar to FIGS. 4 and 5 showing a part of the central portion of the head support in combination with the arresting device, FIG. 8 is a view of the part of the central portion of the head support in combination with the arresting device viewing in the direction of the arrows VIII—VIII in FIG. 7, and FIG. 9 shows a part of the backrest viewing on to the longitudinal channel thereof and the mutually spaced transverse channels.

FIG. 1 shows an embodiment of the child's seat 10 for vehicles, having a seat portion 12 and a backrest 14 which extends upwardly away from the seat portion 12. The seat portion 12 and the backrest 14 can be of a one-part or two-part configuration and suitably connected together. The seat portion 12 has side supports 16 and the backrest 14 has side supports 18. Projecting upwardly beyond the side supports 18, the backrest 14 is provided with a guide portion 20 which forms a corresponding part of the backrest 14 and along which a head support 22 is adjustable in respect of height, in a play-free manner. The head support 22 is provided with an arresting device 24, by means of which the head support 22 can be arrested in the respectively desired position in respect of height.

FIG. 1 shows a configuration of the child's seat 10 in which the head support 22 is adjustable stepwise in respect of height. For that purpose, the guide portion 20 of the backrest 14 is formed at the rear side thereof with mutually spaced retaining or detent openings 26 into which a resilient or detent member (not shown) of the arresting device 22 can latchingly engage. It will be appreciated that the arresting device 24 can also be designed in such a way that the head support 22 is steplessly adjustable in respect of height in relation to the backrest 14 or in relation to the guide portion 20 of the backrest 14.

The head support 22 has two side support portions 28 and a central portion 30 which connects the two side support portions 28 together. With its central portion 30, the head support 22 extends over the rear side of the backrest 14 or the guide portion 20 of the backrest 14, at which the above-mentioned retaining openings 26 are also provided.

The arresting device 24 is provided on the central portion 30 of the head support 22, and is described in greater detail hereinafter with reference to FIGS. 4 through 9.

For play-free adjustment in respect of height of the head support 22 along the guide portion 20 of the backrest 14, the head support 22 is provided with two mutually spaced lateral clamping members 32 which are provided in the transitional region between the central portion 30 and the respective side support portion 28 of the head support at the front side thereof, as can be seen from FIGS. 2 and 3. For play-free linear guidance of the head support 22 in relation to the guide portion 20 of the backrest 14, the guide portion 20 of the backrest 14 is formed at its front side, in the proximity of its two lateral edges 34, with a respective guide groove or channel 36. The two guide channels 36 consequently form a guide device for the head support 22. The guide channels 36 extend in mutually parallel relationship, as can be seen from FIGS. 2 and 3, and the clamping members 32 of the head support 22 engage into the guide channels 36 in positively locking relationship, that is to say in a play-free manner, so that the head support 22 is adjustable in respect of height in play-free manner in relation to the guide portion 20 of the backrest 14. This is indicated in FIG. 3.

The side support portions 28 of the head support 22 are formed with hook-shaped openings 38 which serve to receive a diagonal belt of a three-point safety belt which is specifically mounted to the vehicle.

The seat portion 12 and the backrest 14 are usually provided with a decorative cover which also covers the guide portion 20 of the backrest 14 at the front side thereof laterally as far as the guide channels 36. A further decorative cover extends over the head support 22 between the two side support portions 28 on the front side of the guide portion 20. That arrangement avoids the existence of a cover-free region on the child's seat 10, independently of the respective heightwise setting of the head support 22. That represents a considerable advantage, from decorative points of view. A quite considerable advantage of the child's seat 10 is also that its stability in respect of shape is absolutely independent of the respective heightwise setting of the head support 22.

FIG. 4 is a view in longitudinal section showing a part of the backrest 14, the central portion 30 of the head support 22 and the arresting device 24 which is between the backrest 14 and the head support 22. At its rear side 40 which is towards the central portion 30 of the head support 22, the backrest 14 is provided with a longitudinal groove or channel 42 (see also FIG. 1) and retaining openings or transverse groove or channels 26 which cross the longitudinal channel 42. The longitudinal channel 42 may be closed at its upper end by a removable closure element 29 (see FIG. 9).

The central portion 30 of the head support 22 has a hole 44 (see also FIG. 1) from which the arresting device 24 projects with an actuating handle 46, and is actuable therewith. At its front side 48 which is towards the backrest 14, the central portion 30 of the head support 22, at a spacing from the hole 44, is provided with a transverse channel 50, while at a spacing from the transverse channel 50, it is also provided with a transverse opening 52.

As can also be seen from FIGS. 5 and 6, the transverse opening 52 and the transverse channel 50 are connected together by a longitudinal opening 54.

A guide rib 56 projects from the front side 48 of the central portion 30 of the head support 22, above the hole 44, while a second guide rib 58 projects from the front side 48, beneath the transverse opening 52. The guide ribs 56 and 58 extend into the longitudinal channel 42 at the rear side of the backrest 14 and serve for laterally guiding the head support 22 in relation to the backrest 14.

As FIGS. 7 and 8 also clearly show, the arresting device 24 has a two-armed lever assembly 60 with a pivot axis 64 formed by a transverse rib 62. The transverse rib 62 is supported in the transverse channel 50. The lever assembly 60 has a first lever arm 66 and a second lever arm 68, between which the above-mentioned pivot axis 64 is disposed. Provided at the end portion of the first lever arm 66, which is remote from the pivot axis 64, is a retaining or detent member 70 which is formed by a transverse bar 72. The actuating handle 46 is provided at the end portion of the second lever arm 68, which is remote from the pivot axis 64. The actuating handle 46 and the transverse rib 62 of the arresting device 24 are integrally connected together by lateral connecting limbs 74 (see in particular FIG. 8). The actuating handle 46, the transverse rib 62 and the two lateral connecting limbs 74 thus define a frame 76 which embraces a projection 80 in the central portion 30 of the head support 72, the projection 80 being defined by the transverse channel 50 and two lateral grooves 78 which open into the hole 44 in the central portion 30 of the head support 22. Thus, upon assembly of the head support 22 and the backrest 14, the arresting device 24 can be easily mounted in an accurately defined relationship on the projection 80.

In opposite relationship to the transverse rib 62, the two-armed lever assembly 60 is formed with a curved sliding back 82 which in the assembled condition bears against the bottom 84 of the longitudinal channel 42 (see FIG. 4) and which jointly with the transverse rib 62 forms the pivot axis 64 of the arresting device 24.

Provided between the central portion 30 of the head support 22 and the first lever arm 64 of the two-armed lever assembly 60 is a spring element 86 formed by a compression coil spring. For accurately defined positioning of the spring element 86, the central portion 30 of the head support 22, in the region of the longitudinal opening 54, is provided with a blind hole 88 while the first lever arm 66 of the two-armed lever assembly 60 of the arresting device 24, at its side towards the central portion 30 of the head support 22, is provided with a blind hole 90. The second blind hole 90 is of dimensions such that upon assembly the corresponding end portion of the spring element 86 is held fast in the blind hole 90.

The same details are identified in each of FIGS. 1 through 9 by the same reference numerals so that there is no need for all details to be described in detail in connection with all of those Figures.

What is claimed is:

1. A child's seat for motor vehicles, having a seat portion (12), a backrest (14) having a rear and a head support (22) which has two side support portions (28) and a central portion (30) connecting the two side support portions (28), wherein the position of the head support in relation to the backrest (14) is adjustable, and wherein the backrest has a guide device for adjusting the height of the head support, characterised in that the head support (22) extends with its central portion (30) over the rear of the backrest (14) and that the head support (22) has two mutually spaced clamping members (32) which are provided in a transitional region between the central portion (30) and the respective side support portion (28) at a front side (48) of the head support (22) and are in engagement with the guide device of the backrest.

2. A child's seat as set forth in claim 1 characterised in that the backrest (14) is provided at its front side along two side edges (34) thereof with respective guide channels (36) which extend in mutually parallel relationship, forming the guide device, and which the clamping members (32) of the head support (22) engage.

3. A child's seat as set forth in claim 1 characterised in that the head support (22) can be fixed to the backrest (14) by means of an arresting device (24) which is provided on the head support (22) and which has a resilient retaining member (70).

4. A child's seat as set forth in claim 3 characterised in that the arresting device (24) is provided for incrementally adjusting the height of the head support (22) relative to the backrest (14).

5. A child's seat as set forth in claim 3 characterised in that the arresting device (24) is provided for stepwise adjustment in respect of height of the head support (22) relative to the backrest (14).

6. A child's seat as set forth in claim 5 characterised in that proximate its rear the backrest (14) has retaining openings or tranverse channels (26) which are spaced from each other in the heightwise direction and which are shaped for releasably engaging the resilient retaining member (70).

7. A child's seat as set forth in claim 3 characterised in that the arresting device (24) has a two-armed lever assembly (60) which is pivotable about a central pivot axis (64) between an arresting position and a release position, wherein provided at an end portion of one lever arm (66) of the lever assembly (60) is the retaining member (70) and provided at an end portion of the second lever arm (68) is an actuating handle (46) which is accessible and actuable through a hole (44) in the central portion (30) of the head support (22) from the rear, the pivot axis (64) is formed by a transverse rib (62) which is integrally connected to the lever assembly (60) and which is supported in a transverse channel (50) provided at the front side (48) of the central portion (30) of the head support (22) and spaced from the hole (44) for the actuating handle (46), and provided between the lever assembly (60) and the central portion (30) of the head support (22) is a spring element (86).

8. A child's seat as set forth in claim 7 characterised in that the transverse rib (62) is of a transverse dimension adapted to the transverse dimension of the actuating handle (46) and is connected to the actuating handle (46) by lateral connecting limbs (74) so that the actuating handle (46), the transverse rib (62) and the two lateral connecting limbs (74) define a frame (76) embracing a projection (80) in the central portion (30) of the head support (22), the projection being defined by the transverse channel (50) and two lateral limb grooves (78) which open into the hole (44) in the central portion (30) of the head support (22).

9. A child's seat as set forth in claim 7 characterised in that the central portion (30) of the head support (22) is formed with a transverse opening (52) spaced from the transverse channel (50) for the transverse rib (72), and with a longitudinal opening (54) connecting the transverse channel (50) to the transverse opening (52), wherein in the release position of the actuating handle (46) the longitudinal opening (54) is provided for receiving a corresponding portion of the first lever arm (66) of the lever assembly (60) and the transverse opening (52) is provided for receiving the retaining member (70) formed by a transverse bar (72).

10. A child's seat as set forth in claim 9 characterised in that the first lever arm (68) is formed between the transverse rib (62) and the transverse bar (72) forming the retaining member (70) with a blind hole (90) which is provided for fixing the one end portion of the spring element (86).

11. A child's seat as set forth in claim 9 characterised in that the longitudinal opening (54) is provided with a second blind hole (88) which is provided for fixing the second end portion of the spring element (86).

12. A child's seat as set forth in claim 7 characterised in that the two-armed lever assembly (60) is formed at the side opposite to the transverse rib (62) with a pivot axis sliding back (82).

13. A child's seat as set forth in claim 7 characterised in that the central portion (30) of the head support (22) is provided at its front side (48) with at least one guide groove (56, 58) projecting into a longitudinal channel (42) which is provided at the rear side (40) of the backrest (14) and towards which the retaining member (70) of the arresting device (24) is urged in the normal arresting position by means of the spring element (86).

14. A child's seat as set forth in claim 13 characterised in that the longitudinal channel (42) is provided with spaced-apart transverse channels (26) into which the retaining member (70) is urged in the normal arresting position by means of the spring element (86).

15. A child's seat as set forth in claim 13 characterised in that the longitudinal channel (42) is closed at the upper end by means of a removable closure element.

16. A child's seat as set forth in claim 1 characterised in that the side support portions (28) of the head support (22) are formed with hook-shaped openings (38) for a vehicle diagonal belt.

* * * * *